Oct. 13, 1964  E. J. JUSTUS ETAL  3,152,617
STREAM FLOW VALVE
Filed June 15, 1961  3 Sheets-Sheet 1
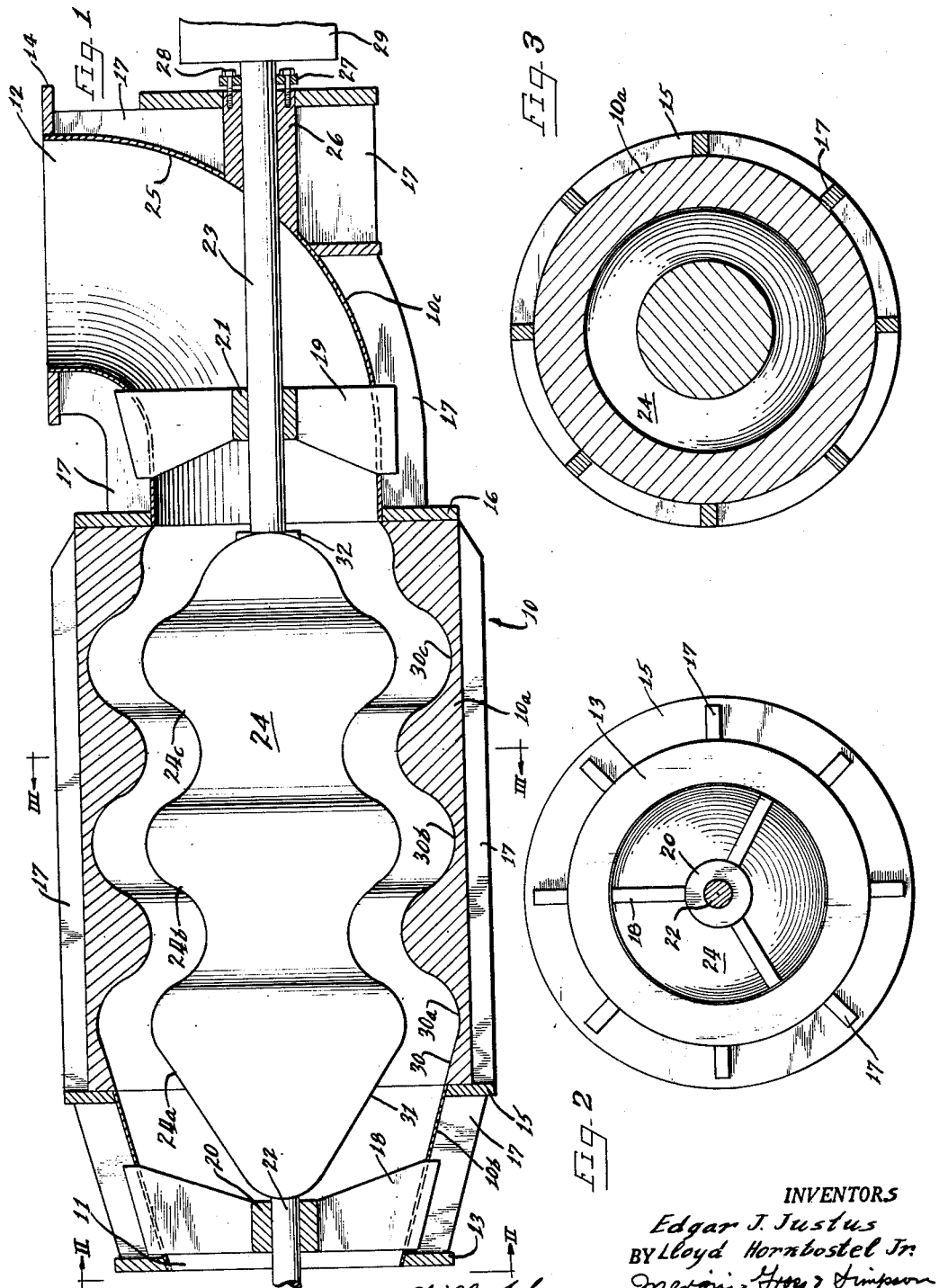
INVENTORS
Edgar J. Justus
BY Lloyd Hornbostel Jr.
ATTORNEYS

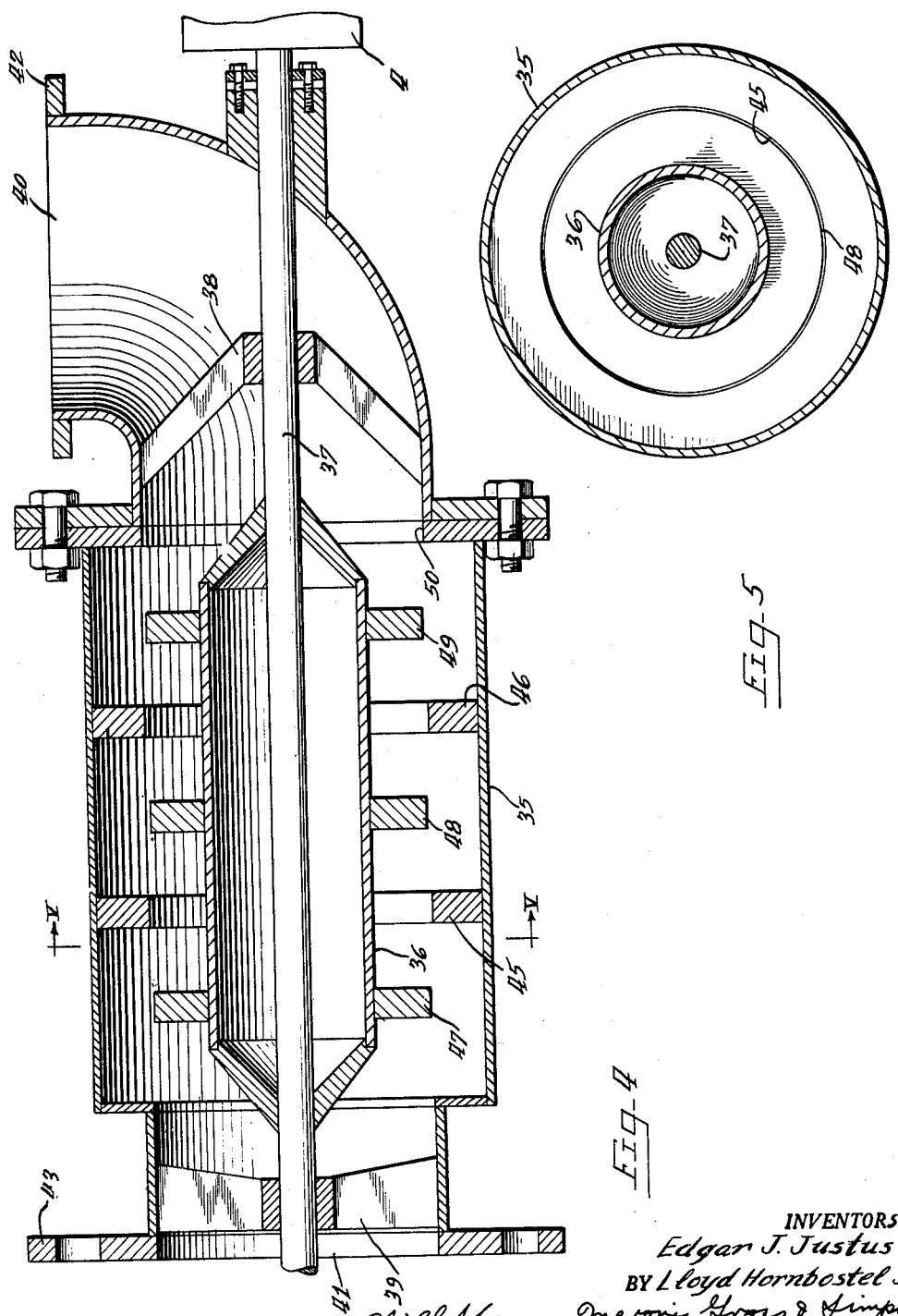

INVENTORS
Edgar J. Justus
BY Lloyd Hornbostel Jr.

ATTORNEYS

United States Patent Office 3,152,617
Patented Oct. 13, 1964

3,152,617
STREAM FLOW VALVE
Edgar J. Justus and Lloyd Hornbostel, Jr., Beloit, Wis., assignors to Beloit Iron Works, Beloit, Wis., a corporation of Wisconsin
Filed June 15, 1961, Ser. No. 117,315
6 Claims. (Cl. 138—43)

This invention relates to a valve for controlling the flow of a stream through a conduit without producing eddy currents, pockets and the like and non-uniformity in the flowing stream. More particularly, the invention relates to a flow regulating valve adapted to handle streams of paper stock, white water, and the like liquid suspensions.

Although the valves of this invention are especially adapted for the control of flowing streams of paper stock and white water which must be handled in a paper mill, and will be hereinafter specifically described in connection with such usage, it should be understood that the valves are capable of controlling the flow of any fluid through a conduit, and that the invention is not limited to any particular use of the valve.

When feeding stock through conduits to a paper machine, it is important that the flow of the stream be positively controlled or throttled to any desired extent. In regulator valves used for this purpose it is desirable that the pressure drop and the rate of flow of the stream through the valve vary substantially linearly with variations in the setting of the valve. This linearity is an advantage since it permits the use of simple motorized positioning equipment or simple direct positioning by hand to suit the required downstream conditions.

Moreover, it is important that cavitation within the control valve be reduced as much as possible, and that the valve provide a certain amount of mixing due to turbulence within the valve structure when a stock stream is being run. It is also important that random pulsations do not extend a considerable distance downstream from the valve structure.

In accordance with this invention a flow regulator valve is provided that includes a casing in the form of a hollow cylinder which has flanges at each end for sealingly connecting the casing to a pair of spaced conduits. A valve body or plug is mounted in the casing between its inlet and outlet openings and the position of the plug is adjustable between these two openings. The inner surface of the casing and the outer surface of the plug are both shaped to present a series of orifice restrictions which regulate the fluid flow from the inlet opening to the outlet opening. In one embodiment of the invention, the orifice restrictions are in the shape of concentric circular rings with smooth surfaces and the maximum outer diameter of the rings on the plug are slightly smaller than the minimum inner diameter of the rings on the casing, with the result that the plugs may be removed or interchanged without changing the entire valve casing. This arrangement also has the important advantages that variations in both the rate of flow through the valve and the pressure drop across it are nearly linear with changes in valve setting. Also, this valve has the advantage of self cleaning performance and it has these advantages throughout a wide range of consistency, i.e., percentage of solid material content.

In another embodiment of the invention, the series of orifice restrictions are formed by concentric annular rings which have substantially square corners. This embodiment of the invention has the advantages of greater losses and dissipation of energy due to the sharp edged orifices; it also has a much lower coefficient of discharge through each of the orifices and, therefore, the losses and pressure and the possibility of regain in velocity and pressure are considerably reduced.

It is an object of this invention to provide a flow regulator valve wherein the rate of flow and the pressure drop across the valve vary substantially linearly with changes in the setting of the valve.

It is still another object of this invention to provide a flow regulator valve wherein the danger of cavitation is substantially reduced and the plug remains relatively clean when used in a stock system.

It is another object of this invention to provide a stream flow regulator valve that produces mixing within the valve and very little pulsation downstream of the valve.

Other objects, features and advantages of the present invention will be apparent from the following detailed description taken in conjunction with the accompanying figures of the drawings, wherein like reference numerals refer to like parts, in which:

FIGURE 1 is an elevational view of a valve constructed in accordance with one embodiment of the invention with some parts broken away to show underlying parts;

FIGURE 2 is a sectional view taken along the line II—II of FIGURE 1;

FIGURE 3 is a sectional view taken along the line III—III of FIGURE 1;

FIGURE 4 is an elevational view of a valve constructed in accordance with another embodiment of the invention with some parts broken away to show underlying parts;

FIGURE 5 is a sectional view taken along the line V—V of FIGURE 4;

As shown on the drawings:

Figure 6:
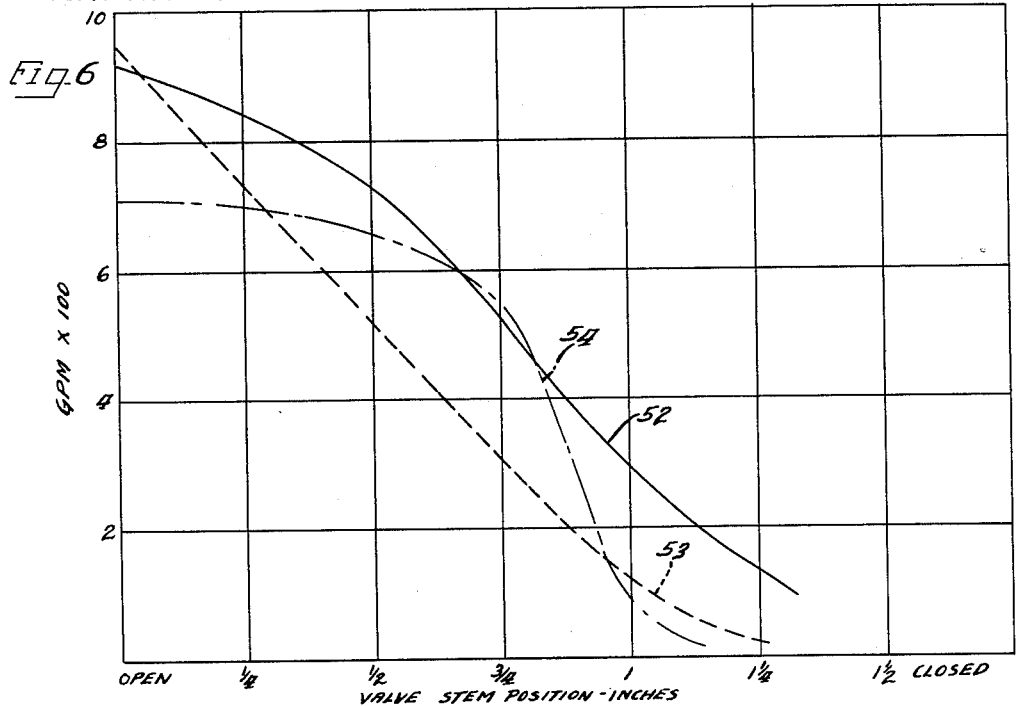
FIGURE 6 is a graph showing the flow rate versus valve stem position characteristics for the two embodiments of the invention illustrated.

The flow regulator valve illustrated in FIGURE 1 includes a valve casing 10 that is made up of a central portion 10a, an outlet end portion 10b, and an elbow shaped inlet end portion 10c. These portions preferably have a substantially circular cross section. The end portion 10b has an outlet opening 11 and the end portion 10c has an inlet opening 12. Radially extending flanges 13 and 14 are formed adjacent the inlet and outlet openings for connecting the casing between two spaced conduit flanges. Second radially extending flanges 15 and 16 are also formed on the portions 10b and 10c which are used to fasten these end portions to the central portion 10a. They may be fastened by a plurality of bolts (not shown) that extend through the flanges 15 and 16 and into the central portion 10a. The valve casing 10 also has a plurality of longitudinal and transverse ribs 17 formed thereon for strengthening purposes.

Mounted within the end portions 10b and 10c of the valve casing 10 are two spiders 18 and 19 which have hubs 20 and 21, respectively, that slidably receive two shafts 22 and 23. Fixed between the two shafts 22 and 23 is a plug or valve body 24 which is positioned within the central portion 10a.

The inlet end portion 10c of the valve casing 10 forms an elbow 25 and the shaft 21 extends through the casing 10 at this point. A boss 26 is formed on the casing which slidably receives the shaft 23. Suitable packing may be provided to prevent fluid from leaking out of the casing 10 during operation if desired. A member 27 is also fastened to the boss 26 by a plurality of bolts 28 and a conventional mechanism 29 is connected to the shaft 23 for varying the longitudinal position of the shaft. This mechanism 29 may be manually or automatically operated and includes a mechanism which holds the shaft 23 against axial forces due to the pressure difference or reduction through the valve.

The center portion 10a of the casing is built up to an increased thickness. The inner surface 30 of this central portion 10a and the outer surface 31 of the valve plug 24 form regular curves having the same pitch and, together, provide a series of concentric circular rings. The minimum inner diameter of the surface 30 is made slightly larger than the maximum outer diameter of the plug 24 so that the plug can be taken out of the casing when the end portion 10b is unfastened from the central portion 10a.

In operation, the flanges 13 and 14 are connected to two spaced fluid conduits and the stream to be regulated is transported through the conduits and the valve. FIGURE 1 illustrates the maximum flow and minimum pressure drop setting of this valve. As can be seen the plug 24 is at the left end of the casing and there is maximum clearance between adjacent hills formed on the surfaces 30 and 31. When the rate of flow of the stream is to be decreased, the mechanism 29 is operated to draw the shaft 23 and the plug 24 longitudinally toward the right which causes the hills on the two surfaces 30 and 31 to move closer together. This action gradually decreases the size of the orifice openings formed between these hills and decreases the flow capacity of the valve. In the minimum flow and maximum pressure drop setting of the valve, a member 32 on the end of the plug 24 abuts the hub 21 and the hills on the two surfaces 30 and 31 are adjacent each other. Since there is a slight clearance between the maximum outer diameter of the plug 24 and the minimum inner diameter of the casing, however, the flow of the stream will not be cut off entirely.

In the embodiment here shown for the plug 24, the plug has the general shape of nested conical elements 24a, 24b and 24c with rounded bases (or even nested spheres), and the central portion wall sections 30a, 30b, 30c conforming therewith. In side elevation (FIGURE 1) any pair of such elements 24a, 24b and 24c has the general shape of a dumbbell. Expressed in other terms the elements 24a, 24b, 24c form nested tear drops. In any case, the wall sections 30a, 30b 30c, respectively, conform generally to the contours of the plug 24.

The embodiment of the invention illustrated in FIGURES 4 and 5 has a series of sharp orifice restrictions which are formed between a substantially cylindrical valve casing 35 and a concentric plug 36. The plug 36 is mounted on a shaft 37 that is slidably positioned in two spiders 38 and 39 between the inlet and outlet ends 40 and 41, respectively. Flanges 42 and 43 are formed adjacent the inlet and outlet ends for connecting the valve mechanism to two spaced fluid conduits in the manner previously described.

The inlet end portion of the valve is again formed as an elbow and the shaft 37 extends through the outer wall of this elbow portion. Once again, a conventional mechanism 44 is connected to one end of the shaft 37 in order to vary the longitudinal position of this shaft and to hold the shaft 37 against the axial forces.

Two annular rings 45 and 46 having relatively square or sharp corners are fastened to the interior surface of the valve casing 35, and three annular rings 47, 48, and 49 also having relatively square or sharp corners fastened to the exterior surface of the plug 36. In addition, an inwardly extending flange 50 having square corners or edges is formed at the end of the casing 35.

When the plug 36 is in the position shown in FIGURE 4 wherein the ring 48 is substantially intermediate the two rings 45 and 46, the valve is in the maximum flow rate setting since there is maximum clearance between the rings formed on the plug member 36 and the casing 35. To place the valve in the minimum flow rate setting, the shaft 37 is moved toward the right until the ring 47 is adjacent the ring 45, the ring 48 is adjacent the ring 46, and the ring 49 is adjacent the inwardly extending flange 50. Since there is only a very slight clearance between these rings, the flow is practically stopped.

This design has the advantage over the embodiment of the invention illustrated in FIGURE 1 that it produces greater losses and dissipation of energy due to the sharp edged orifices.

FIGURE 6 illustrates the flow rate versus valve stem position for the two embodiments of the invention illustrated. Curve 52 represents the flow rate characteristic of the embodiment of the invention illustrated in FIGURE 1 which has the smooth orifice restrictions when it is passing .2% waste news stock in a paper machine. Curve 53 represents the capacity of this same valve when using .25% waste news stock. The capacity of the valve illustrated in FIGURE 4 versus valve setting is shown by the curve 54 which is again for .25% waste news stock.

Figure 7:
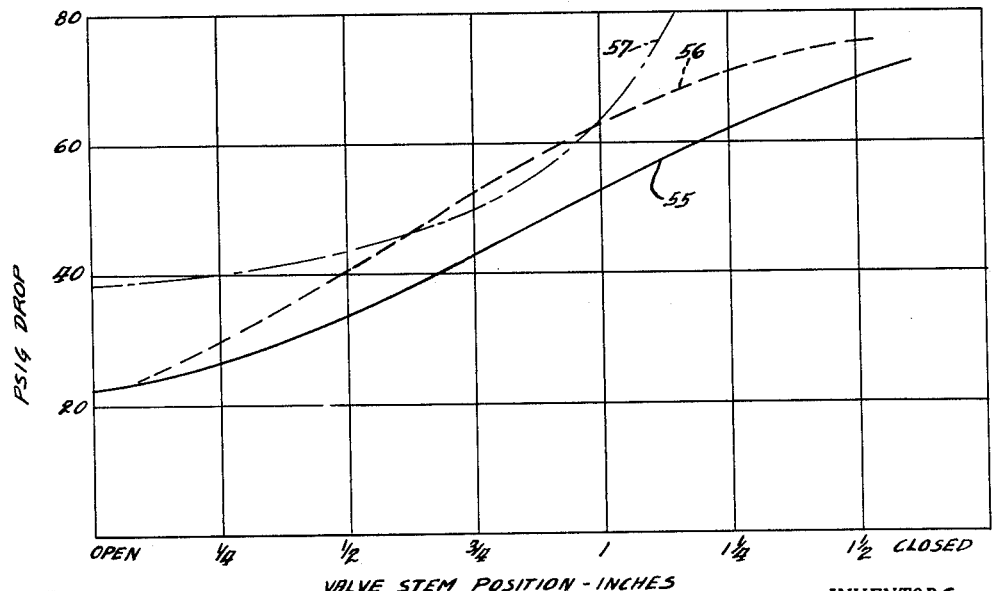
FIGURE 7 is a graph showing the pressure drop versus valve stem position characteristics for the two embodiments of the invention illustrated.

In FIGURE 7 is illustrated the pressure drop across the valve versus stem position for the two embodiments of the invention. Curve 55 is for the valve having smooth orifice restrictions running .2% waste news stock, curve 56 is for this same valve running .25% news stock, and curve 57 is for the valve having sharp edged orifice restrictions running .25% news stock.

It is apparent from the curves that the valve structure having smooth orifice restrictions has a more nearly linear response while the valve structure having the sharp edged orifices has the advantage of greater losses and dissipation of energy. Also, the valve having sharp edged orifice restrictions has the advantage of a much lower coefficient of discharge through each of the orifices; therefore, the losses and pressure and the possibility of regain in velocity and pressure are considerably reduced.

The valve having smooth orifice restrictions has the further advantage that it remains very clean during operating (not stock build-up) and has practically no tendency to produce cavitation, especially when passing a stock stream. A certain amount of turbulence is created within the two types of valves which aids the mixing operation when a stock stream is being run, but this turbulence does not extend an appreciable distance downstream from the valve. The down stream turbulence for the two types of valves illustrated as substantially identical and is considerably better than conventional valves.

It is apparent that the contour of the mating surfaces of the plug and casing in the embodiments illustrated could be changed somewhat and still provide substantially the same advantages.

It will be apparent that modifications and variations may be effected without departing from the scope of the novel concepts of the present invention, and it will be understood that the application is to be limited only by the scope of the appended claims.

We claim as our invention:

1. A fluid flow regulator valve adapted to be mounted between two spaced fluid conduits comprising a substantially cylindrical casing having connecting inlet and outlet openings, a member concentrically mounted within said casing between said inlet and outlet openings, the position of said member being adjustable between said inlet and outlet openings, the cross section of said member and said casing presenting a series of concentric rings with valleys therebetween that vary in diameter along the length of said casing, said varying diameters presenting a series of orifice restrictions which throttle fluid flow from said inlet opening to said outlet opening, the shape and size of said rings and valleys of said casing and said member being substantially the same and conforming to each other.

2. A stream flow regulator valve comprising a substantially cylindrical casing having an inlet end and an outlet end, said inlet end being formed as an elbow, an inlet opening formed at said inlet end and an outlet opening formed at said outlet end, radially extending flanged formed adjacent said inlet and outlet openings for attachment to two spaced fluid conduits, first and second spiders mounted within said casing adjacent said inlet and outlet ends respectively, a shaft slidably mounted within said first and second spiders and extending through the wall of said casing at said elbow, a valve plug mounted within said casing on said shaft between said first and second spiders, the outer surface of said plug and the inner surface of said casing adjacent said plug forming smooth sinuate surfaces having equal pitch, means connected to the portion of said shaft that extends outside of said casing for varying the position of said shaft and said plug in the direction of flow of fluid from said inlet opening to said outlet opening, said inner surface of said casing and said outer surface of said plug coacting to form a series of orifice restrictions which throttle fluid flow from said inlet opening to said outlet opening, and the maximum outer diameter of said plug being slightly smaller than the minimum inner diameter of said casing so that said plug can be removed from said casing.

3. A fluid flow regulator valve adapted to be mounted between two spaced fluid conduits comprising a substantially cylindrical casing having connecting inlet and outlet openings, a member concentrically mounted within said casing between said inlet and outlet openings, the position of said member being adjustable between said inlet and outlet openings, the cross section of said member and said casing presenting a series of concentric rings with valleys therebetween that vary in diameter along the length of said casing, said varying diameters presenting a series of orifice restrictions which throttle fluid flow from said inlet opening to said outlet opening, the shape of said rings and valleys of said casing and said member being substantially the same and conforming to each other.

4. A fluid flow regulator valve adapted to be mounted between two spaced fluid conduits comprising a substantially cylindrical casing having connecting inlet and outlet openings, a member concentrically mounted within said casing between said inlet and outlet openings, the position of said member being adjustable between said inlet and outlet openings, the cross section of said member and said casing presenting a series of smooth concentric rings that vary in diameter along the length of said casing with smooth annular recesses therebetween with said rings and recesses being of substantially the same shape and conforming to each other, said varying diameters presenting a series of orifice restrictions which throttle fluid flow from said inlet opening to said outlet opening, the maximum outer diameter of said member being slightly smaller than the minimum inner diameter of said casing.

5. A fluid flow regulator valve adapted to be mounted between two spaced fluid conduits comprising a casing having connecting inlet and outlet openings, a plug mounted within said casing on a shaft, a plurality of spiders mounted within said casing and slidably supporting said shaft, said shaft extending through the wall of said casing, means mounted outside of said casing and attached to said shaft for varying the longitudinal position of said shaft relative to said casing, the inner surface of said casing and the outer surface of said plug being shaped to present a plurality of rings with valleys therebetween with said rings and valleys being of substantially the same shape and conforming to each other to form orifice restrictions which throttle fluid flowing from said inlet opening to said outlet opening, the maximum outer diameter of said plug being less than the minimum inner diameter of said inner surface of the casing.

6. A fluid flow regulator valve adapted to be mounted between spaced fluid conduits comprising a casing having inlet and outlet openings, a member mounted within said casing between said inlet and outlet openings, the position of said member being adjustable between said inlet and outlet openings, the inner surface of said casing and the outer surface of said member presenting smooth annular rings with sinuate shaped alternate surfaces and recesses between the rings having sinuate shapes and said rings and recesses conforming to each other and being of substantially the same shape to form a series of orifice restrictions between them, said orifice restrictions acting to throttle fluid flow passing between said surfaces.

References Cited in the file of this patent

UNITED STATES PATENTS

| 2,568,084 | Mockridge | Sept. 18, 1951 |
| 2,750,961 | Uritis | June 19, 1956 |
| 2,825,509 | Pope et al. | Mar. 4, 1958 |

FOREIGN PATENTS

| 350,071 | Germany | Mar. 13, 1922 |
| 956,957 | Germany | Jan. 24, 1957 |
| 720,559 | Great Britain | Dec. 22, 1954 |